US007917253B2

(12) United States Patent
Inbarajan et al.

(10) Patent No.: US 7,917,253 B2
(45) Date of Patent: Mar. 29, 2011

(54) METHOD FOR MAKING VEHICLE-RELATED DATA AVAILABLE TO AN AUTHORIZED THIRD PARTY

(75) Inventors: Krishnaraj Inbarajan, Troy, MI (US); Thomas P. Grau, Rochester, MI (US); Luc Feilla, Bloomfield Hills, MI (US); Shawn Drwencke, Chesterfield, MI (US)

(73) Assignee: General Motors LLC, Detroit, MI (US)

( * ) Notice: Subject to any disclaimer, the term of this patent is extended or adjusted under 35 U.S.C. 154(b) by 1070 days.

(21) Appl. No.: 11/562,876

(22) Filed: Nov. 22, 2006

(65) Prior Publication Data

US 2008/0119983 A1 May 22, 2008

(51) Int. Cl.
*H04L 9/00* (2006.01)

(52) U.S. Cl. ........................................... 701/1; 340/933

(58) Field of Classification Search ................ 701/2, 29, 701/101, 115, 117, 102, 114, 33; 340/3.1, 340/991, 933; 370/328, 401
See application file for complete search history.

(56) References Cited

U.S. PATENT DOCUMENTS 6,611,740 B2 8/2003 Lowery et al.
6,636,790 B1 10/2003 Lightner et al.
6,732,031 B1 5/2004 Lightner et al.
6,732,032 B1 5/2004 Banet et al.
6,879,894 B1 4/2005 Lightner et al.
6,928,348 B1 8/2005 Lightner et al.
7,401,233 B2 * 7/2008 Duri et al. .................... 713/193
7,421,334 B2 * 9/2008 Dahlgren et al. ............. 701/117
2003/0112133 A1 * 6/2003 Webb et al. .................. 340/436
2004/0185842 A1 * 9/2004 Spaur et al. .................. 455/420
2004/0203696 A1 10/2004 Jijina et al.
2004/0203903 A1 10/2004 Wilson et al.
2006/0106584 A1 5/2006 Oesterling et al.
2008/0039983 A1 2/2008 Oesterling et al.
2008/0140571 A1 6/2008 Inbarajan et al.

FOREIGN PATENT DOCUMENTS

WO WO2005039927 5/2005

* cited by examiner

*Primary Examiner* — Dalena Tran

(74) *Attorney, Agent, or Firm* — Anthony L. Simon; Reising Ethington P.C.

(57) ABSTRACT

A method for obtaining vehicle-related data from a vehicle equipped with a telematics unit and making that data temporarily available to a third party that has been approved by an authorized user, such as the vehicle owner. This enables the authorized user to decide which third parties, if any at all, are to receive vehicle-related data so that they may take advantage of any promotions or other services that are offered by the third parties. The vehicle-related data is preferably maintained on a temporary basis so that after the occurrence of an event, such as the expiration of a predetermined period of time or after the authorized third party has already accessed the vehicle-related data, the data is deleted.

23 Claims, 2 Drawing Sheets

METHOD FOR MAKING VEHICLE-RELATED DATA AVAILABLE TO AN AUTHORIZED THIRD PARTY

TECHNICAL FIELD

The present invention generally relates to the storage and distribution of vehicle-related data and, more particularly, to a method for storing vehicle-related data that is wirelessly sent from a vehicle telematics unit and making that data available to an authorized third party.

BACKGROUND OF THE INVENTION

Some manufacturers have developed vehicles that are equipped with telematics-based systems capable of communicating a diverse amount of information to and from the vehicle. For example, there are telematics-based systems that can communicate with a vehicle to obtain information such as diagnostic trouble codes (DTCs), engine oil life, and vehicle mileage. The telematics-based system can then analyze that data at a technical research facility or other remote facility in order to assist the manufacturer in improving the quality and design of the vehicle.

Some of the information gathered and sent by the telematics-based system may be useful to other parties as well, such as car dealerships, vehicle repair facilities, parts suppliers, oil-change shops, etc. However, there are challenges and concerns associated with distributing vehicle-related data to third parties, as some vehicle owners may not want data from their vehicle shared with anyone.

SUMMARY OF THE INVENTION

According to one aspect of the invention, there is provided a method for making vehicle-related data available to an authorized third party. This method generally comprises the steps of: (a) receiving vehicle-related data from a telematics unit; (b) storing the vehicle-related data in a first database; (c) storing at least a portion of the vehicle-related data in a second, temporary database; (d) enabling the authorized third party to access the portion of vehicle-related data that is stored in the second database; and (e) deleting the portion of vehicle-related data that is stored in the second database.

According to another aspect, there is provided a method that generally comprises the steps of: (a) storing vehicle-related data approved by an authorized user in a customer database; (b) storing at least a portion of the vehicle-related data in a third party database; (c) alerting the authorized third party that the vehicle-related data that is stored in the third party database is available; (d) enabling the authorized third party to access the portion of the vehicle-related data stored in the third party database; and (e) deleting the portion of the vehicle-related data that is stored in the third party database once the data is accessed by the authorized third party.

BRIEF DESCRIPTION OF THE DRAWINGS

Preferred exemplary embodiments of the present invention will hereinafter be described in conjunction with the appended drawings, wherein like designations denote like elements, and wherein.

DETAILED DESCRIPTION OF THE PREFERRED EMBODIMENTS

The data sharing method described below can be used to automatically obtain vehicle-related data from a vehicle equipped with a telematics unit and make that data temporarily available to a third party that has been approved by an authorized user, such as the vehicle owner. This enables the vehicle owner to decide which third parties, if any at all, are to receive vehicle-related data so that the vehicle owner may take advantage of any promotions or other services that are offered by the third parties. For example, an authorized oil-change shop could offer vehicle maintenance services that include automatically sending the vehicle owner a discount coupon for an oil change when the vehicle-related data suggests that the engine oil-life is below a certain threshold. After the occurrence of an event, such as an expiration of time, the vehicle-related data is no longer made available to the authorized third party.

Communications System

Figure 1:
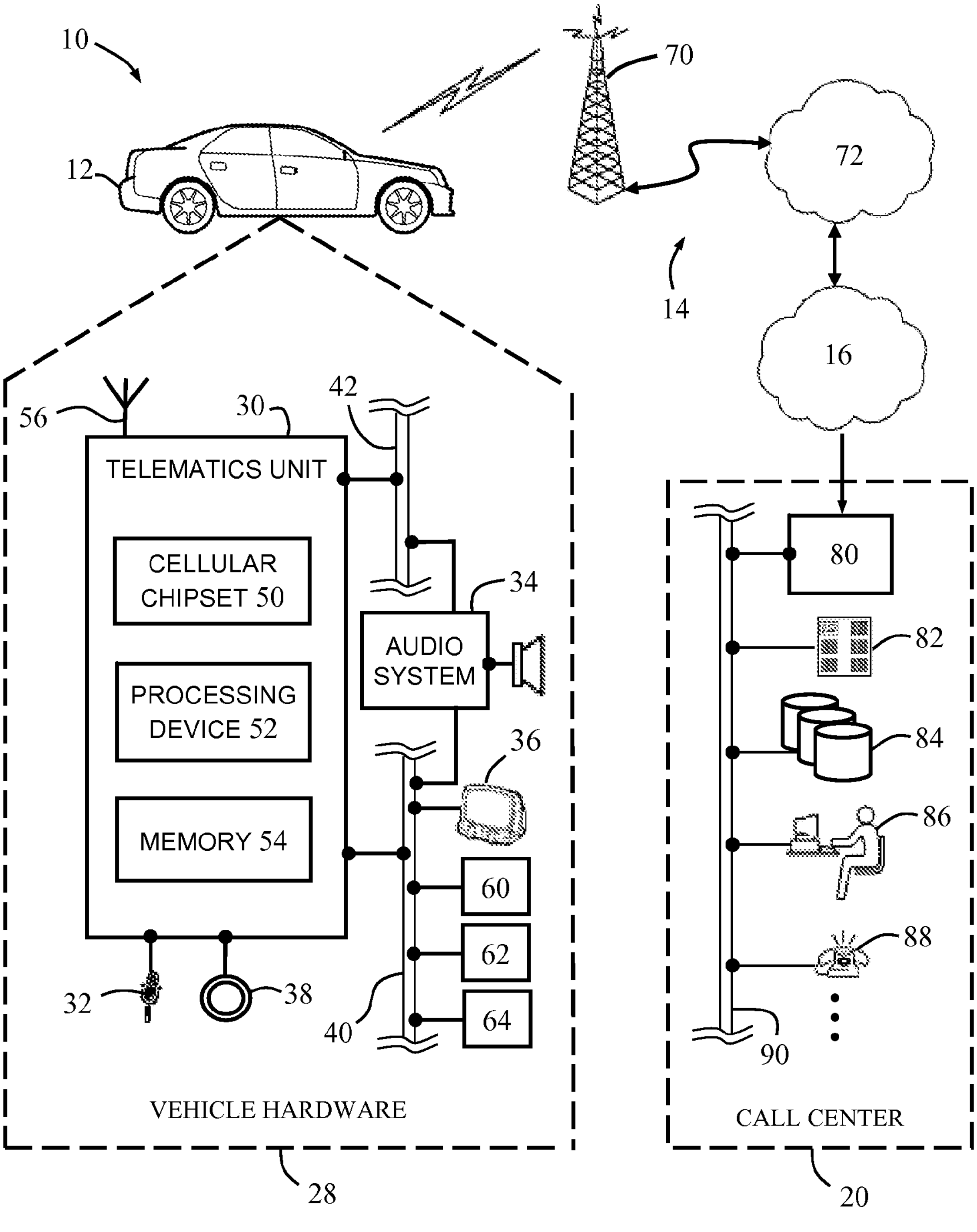
FIG. 1 is a block diagram of a system that is capable of utilizing the method for making vehicle-related data available to an authorized third party.

Beginning with FIG. 1, there is shown an exemplary operating environment that can be used to implement the data sharing method disclosed herein. Communications system 10 generally includes a vehicle 12, a wireless carrier system 14, a communications network 16, and a call center 20. It should be understood that the method can be used with any number of different systems and is not specifically limited to the examples shown here. Also, the overall architecture, setup, and operation, as well as the individual components, of a system such as that shown here are generally known in the art. Thus, the following paragraphs simply provide a brief overview of one such exemplary system 10; however, other systems not shown here could employ the disclosed method as well.

Vehicle 12 is depicted in the illustrated embodiment as a passenger car, but it should be appreciated that any other vehicle including motorcycles, trucks, sports utility vehicles (SUVs), recreational vehicles (RVs), marine vessels, aircraft, etc., can also be used. Some of the vehicle hardware 28 is shown generally in FIG. 1 and includes a telematics unit 30, a microphone 32, an audio system 34, a visual display 36, an electronic button or control 38, and several vehicle electronic modules (VEMs) 60-64 that are interconnected using one or more network connections, such as a communications bus 40 or an entertainment bus 42. Examples of suitable network connections include a controller area network (CAN), a media oriented system transfer (MOST), a local interconnection network (LIN), an ethernet, a local area network (LAN), and other appropriate connections such as those that conform with known ISO, SAE and IEEE standards and specifications, to name but a few.

Telematics unit 30 preferably enables wireless voice and/or data communication over wireless carrier system 14 so that the vehicle can communicate with call center 20, other telematics-enabled vehicles, or some other entity. The telematics unit preferably uses radio transmissions to establish a communications channel (a voice channel and/or a data channel) with wireless carrier system 14 so that voice and/or data transmissions can be sent and received over the channel. By providing both voice and data communication, telematics unit 30 enables the vehicle to offer a number of different services including those related to navigation, telephony, emergency assistance, diagnostics, infotainment, etc. According to one embodiment, telematics unit 30 includes a standard cellular chipset 50 for voice communications like hands-free calling, a wireless modem (not shown) for data transmission, an electronic processing device 52, one or more electronic memory devices 54, and a dual antenna 56. It should be appreciated that the modem can either be implemented through software that is stored in the telematics unit and is processed by electronic processing device 52, or it can be a separate hardware component located internal or external to telematics unit 30. The modem can operate using any number of different standards or protocols such as EVDO, CDMA, GPRS, EDGE, and WiMAX to name but a few.

Electronic processing device 52 can be any type of suitable processing device capable of processing electronic instructions including, but certainly not limited to, microprocessors, microcontrollers, host processors, controllers, vehicle communication processors, and application specific integrated circuits (ASICs). Alternatively, the electronic processing device can work in conjunction with some type of central processing unit (CPU) or other component performing the function of a general purpose processor. Electronic processing device 52 executes various types of electronic instructions, such as software or firmware programs stored in electronic memory 54, which enable the telematics unit to provide a wide variety of services. For instance, electronic processing device 52 can execute programs or process data that enables the data sharing method discussed herein.

Telematics unit 30 provides too many services to list them all, but several examples include: turn-by-turn directions and other navigation-related services that are provided in conjunction with a GPS-based vehicle navigation unit; airbag deployment notification and other emergency or roadside assistance-related services that are provided in connection with one or more collision sensor interfaces; and infotainment-related services where music, webpages, movies, television programs, videogames and/or other information is downloaded by an infotainment unit and is stored for current or later playback. The above-listed services are by no means an exhaustive list of all of the capabilities of telematics unit 30, but are simply an illustration of some of the services that the telematics unit is capable of offering.

Vehicle hardware 28 also includes a number of vehicle user interfaces that provide vehicle occupants with a means of providing and/or receiving information, including microphone 32, audio system 34, visual display 36, and button 38. These devices allow a vehicle user to input commands, receive audio/visual feedback, and provide voice communications, to name but some of the possibilities. Microphone 32 provides an occupant with a means for inputting verbal or other auditory information, and can be connected to an automated voice processing unit utilizing human-machine interface (HMI) technology known in the art. Conversely, audio system 34 provides verbal output to a vehicle occupant and can be a dedicated, stand-alone system or part of the primary vehicle audio system. According to the particular embodiment shown here, audio system 34 is operatively coupled to both vehicle bus 40 and entertainment bus 42 and can provide AM, FM and satellite radio, CD, DVD and other multimedia functionality. This functionality can be provided in conjunction with or independent of the infotainment module described above. Visual display 36 is preferably a graphics display, such as a touch screen on the instrument panel or a heads-up display reflected off of the windshield, and can be used to provide a multitude of input and output functions. Button 38 is an electronic pushbutton or other control that is typically used to initiate communication or some other service with call center 20. Of course, numerous other vehicle user interfaces can also be utilized, as the aforementioned interfaces are only examples of some of the possibilities.

The vehicle electronic modules (VEMs) 60-64 are generally electronic hardware components that are located throughout the vehicle and typically receive input from one or more sensors and use the sensed input to perform diagnostic, monitoring, control, reporting and/or other functions. Each of the VEMs 60-64 is preferably connected by communications bus 40 to the other VEMs, as well as to the telematics unit 30, and can be designed to run various vehicle system and subsystem programs. As examples, VEM 60 can be an engine control module that monitors various aspects of engine operation such as engine oil life and ignition timing, VEM 62 can be a safety control module that regulates operation of one or more airbags in the vehicle, and VEM 64 can be a body control module that governs various electrical components located throughout the vehicle, like the vehicle's power door locks and headlights. Each of the VEMs 60-64 is preferably able to provide a standardized series of diagnostic trouble codes (DTCs) that allow a technician to rapidly identify and remedy malfunctions within the vehicle. As is appreciated by those skilled in the art, the above-mentioned VEMs are only examples of some of the modules that may be used in vehicle 12, as numerous others are also possible. Furthermore, it should be understood that the aforementioned VEMs could be implemented in the form of software instead of being separate hardware components, they could be located within telematics unit 30, or they could be integrated and/or shared with each other or with other systems located throughout the vehicle, to cite but a few possibilities. It is anticipated that one or more of the VEMs that interact with telematics unit 30 will utilize sensors, like gyroscopes, accelerometers, magnetometers, and emission detection sensors, for reporting different operational, environmental, or other conditions surrounding the vehicle.

Wireless carrier system 14 is preferably a cellular telephone system but could be any other suitable wireless system, such as a satellite-based system, that is capable of transmitting signals between vehicle hardware 28 and call center 20. According to an exemplary embodiment, wireless carrier system 14 includes one or more cell towers 70, base stations and/or mobile switching centers (MSCs) 72, as well as any other networking components required to connect wireless carrier system 14 with land network 16. As is appreciated by those skilled in the art, various cell tower/base station/MSC arrangements are possible and could be used with wireless system 14. For instance, the base station and cell tower could be co-located at the same site or they could be remotely located from one another, each base station could be responsible for a single cell tower or a single base station could service various cell towers, and various base stations could be coupled to a single MSC, to name but a few of the possible arrangements.

Land network 16 may be a conventional land-based telecommunications network that is connected to one or more landline telephones and connects wireless carrier system 14 to call center 20. For example, land network 16 may include a public switched telephone network (PSTN) and/or a TCP/IP network, as is appreciated by those skilled in the art. Of course, one or more segments of land network 16 could be implemented through the use of a standard wired network, a fiber or other optical network, a cable network, power lines, other wireless networks such as wireless local area networks (WLANs), or networks providing broadband wireless access (BWA), or any combination thereof. Furthermore, call center 20 need not be connected via land network 16, but could include wireless telephony equipment so that it can communicate directly with a wireless network, such as wireless carrier system 14.

Call center 20 is designed to provide the vehicle hardware 28 with a number of different system back-end functions and, according to the exemplary embodiment shown here, includes one or more switches 80, servers 82, databases 84, live advisors 86, as well as a variety of other telecommunication and computer equipment 88 that is known in the art. These various call center components are preferably coupled to one another via a wired or wireless local area network 90. Switch 80, which can be a private branch exchange (PBX) switch, routes incoming signals so that voice transmissions are usually sent to either the live adviser 86 or an automated response system, and data transmissions are passed on to a modem or other piece of equipment 88 for demodulation and further signal processing. The modem can be connected to various devices such as a server 82 and databases 84. Data transmissions may also be conducted by wireless systems, such as 802.11x, GPRS, and the like. Although the illustrated embodiment has been described as it would be used in conjunction with a manned call center 20, it will be appreciated that the call center can utilize an unmanned automated call response system and, in general, can be any central or remote facility, manned or unmanned, mobile or fixed, to or from which it is desirable to exchange voice and/or data transmissions. Moreover, call center 20 could be a data center, a server farm, a data library, or any other suitable facility or installation, whether it be manned or unmanned, that is capable of receiving and storing data from the vehicle.

Databases 84 can include a variety of databases and/or other data structures, but preferably include at least a customer database and a third party database. The customer database is generally a permanent or semi-permanent database that is designed to store vehicle-related data such as DTCs, emissions data, vehicle mileage, tire pressure, oil life, geographic information, as well as any other pertinent vehicle-related data that is sent from the vehicle. In addition, the customer database could store subscriber authentication information, profile records, behavioral patterns, and other pertinent customer-related data. The third party database, on the other hand, is generally a temporary database that is coupled to the customer database and land network 16 so that it can exchange information with the customer database and various third parties, as will be subsequently explained in more detail. As used herein, "temporary database" means a database in which individual items of customer-related data are maintained on a temporary basis; e.g., until a period of time has passed or some event (e.g., oil change, the data is accessed, etc.) has occurred.

Method for Making Vehicle-Related Data Available

Figure 2:
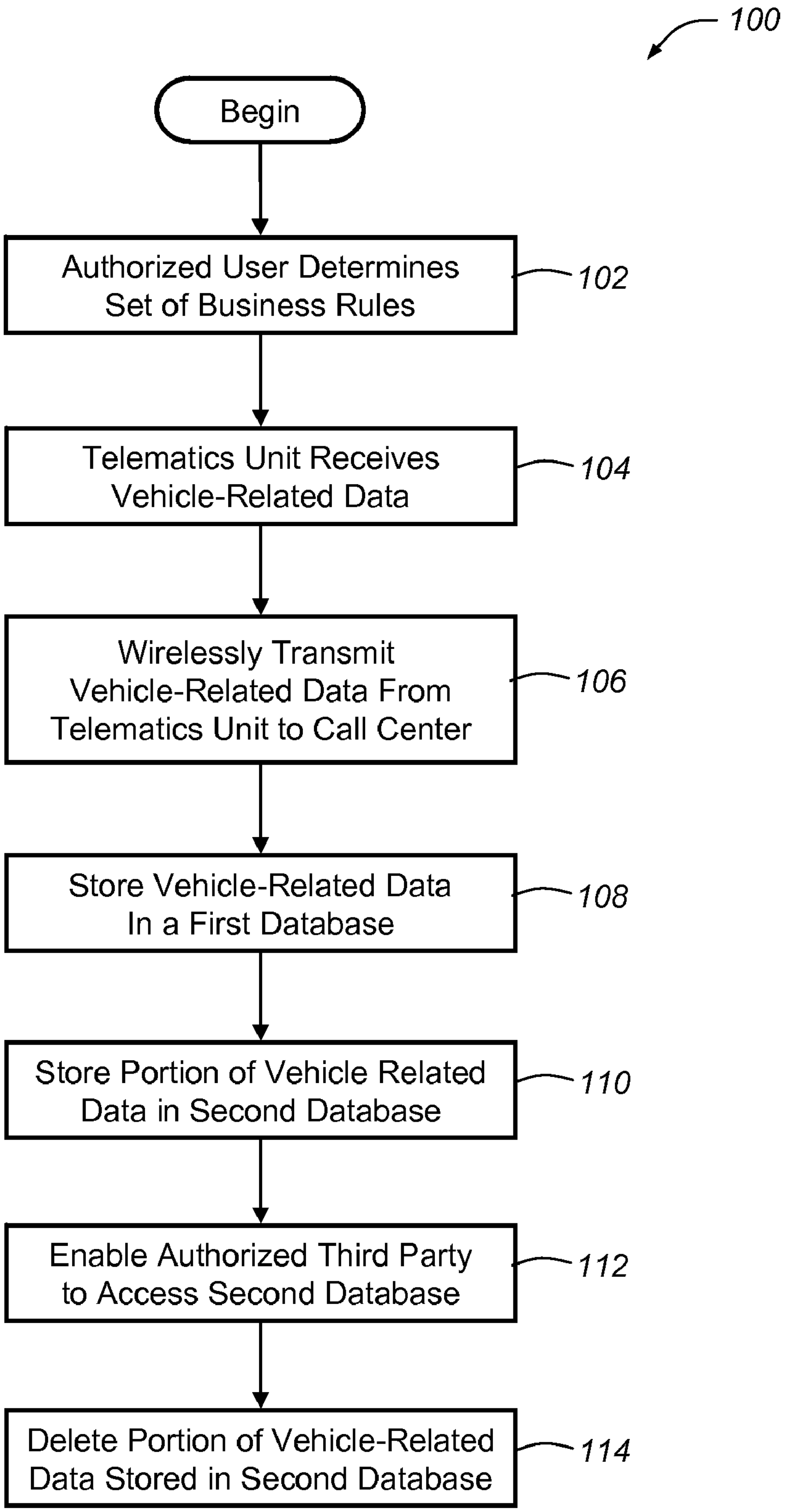
FIG. 2 is a flowchart showing some of the steps of an embodiment of the data sharing method.

Turning now to FIG. 2, there are shown some of the steps of an embodiment of data sharing method 100, which makes vehicle-related data wirelessly collected from vehicle 12 temporarily available to one or more third parties that have been approved by an authorized user. Beginning with step 102, an authorized user first sets up a predetermined set of business rules that dictate which vehicle-related data, if any, is to be distributed, and which authorized third parties are to receive the data. The authorized user could be one of a number of different parties, including the vehicle owner, the regular vehicle driver, the service subscriber, the vehicle manufacturer, etc. According to one example, the authorized user is the vehicle owner and step 102 is generally performed at or near the time of vehicle purchase, vehicle lease, and/or service initialization. In this instance, the vehicle owner establishes at the onset if they are going to participate in third party data distribution and, if so, determines which vehicle-related data is to be shared and which third parties are to receive the vehicle-related data. It should be noted that the establishment of business rules can be a manual or an automated process, it can occur at any time prior to the distribution of vehicle-related data to third parties, it can be performed in person or remotely through the use of an authorized website or the like, and it can be carried out according to a number of different methods and involving a number of different parties.

Next, telematics unit 30 receives various types of vehicle-related data from one or more modules, units, components, devices, programs, etc. operating throughout the vehicle, step 104. Examples of acceptable vehicle-related data include: a vehicle mileage reading, a vehicle location (past and/or present), a vehicle history (record of driving times, average driving speed, etc.), a diagnostic trouble code (DTC), an engine oil life reading, emissions data, tire pressure, and a vehicle identification number (VIN), to name but a few possibilities. It should be appreciated that the aforementioned examples are only some of the types of vehicle-related data that can be gathered by telematics unit 30, as other types of information relating to the vehicle could be used as well. According to one example, telematics unit 30 acquires vehicle-related data in the form of a vehicle mileage reading from engine control module 60 and a DTC from body control module 64; both of which are sent to the telematics unit over vehicle communication bus 40.

After the relevant vehicle-related data has been gathered at telematics unit 30, step 106 wirelessly transmits the vehicle-related data from the telematics unit to call center 20 over wireless carrier system 14. The vehicle-related data can be transmitted to the call center across a data or a voice channel of the wireless carrier system, however, it is preferably compressed and scrambled and then sent over a data channel. There are a number of different timing conditions that could be used to determine when and how frequently the vehicle-related data is sent to call center 20. For instance, the vehicle-related data transmissions could be scheduled to occur in a periodic fashion such as, for example, once a day, week, month, etc. Alternatively, the vehicle-related data transmission in step 106 could be in response to some event occurring at vehicle 12, call center 20, or elsewhere, and different events or categories of events could have different priority levels associated therewith. The priority level of the event can determine when the vehicle-related data associated with that event is sent to the call center. For example, vehicle-related data that is considered critical, such as safety-related data, could be assigned a high priority level and be sent as soon as it is detected by telematics unit 30 instead of waiting for a scheduled data transmission. Call center 20 would then be in a position to quickly disseminate the critical information to authorized third parties as soon as it was received. According to another embodiment, the vehicle-related data transmission of step 106 could be in response to a request initiated at call center 20 or at a third party and communicated directly to the vehicle or through the call center.

In step 108, the vehicle-related data that was wirelessly transmitted in the previous step is stored in a first database 84 at call center 20. The first database is preferably a customer database that is designed to store both vehicle-related data and customer-related data on a permanent or semi-permanent basis, and is secured so that it is generally not accessible by third parties. As previously indicated, customer-related data could include various types of information associated with the vehicle owner, the vehicle driver, the service subscriber, etc., including subscriber authentication information, profile records, behavioral patterns, as well as any other information pertinent to the customer. The customer database can be maintained within call center 20 in a manner that allows various systems, both internal to and external to the call center, to access and interact with the data stored therein. The customer database can be implemented as a relational database, a dimensional database, an object-orientated database, or a flat file, to name just a few possibilities. In this regard, the term “database,” as used herein, means a collection of data stored in a manner such that individual data items can be retrieved from the collection either using an index or by searching or any other means, and is not intended to be limited to particular types of databases or data structures. Moreover, the customer database preferably maintains its contents on a permanent or semi-permanent basis by archiving the vehicle-related data or by saving it according to other techniques known in the art.

Each authorized user, whether they be a vehicle owner, primary driver, service subscriber, etc., can have a separate entry in the customer database. That way, all of the vehicle-related data transmitted from that user’s vehicle can be associated with a corresponding entry in the customer database. The customer database can maintain a history of all the vehicle-related data associated with the customer and can allow the call center to provide a myriad of services to the vehicle and to the authorized user. According to one example, call center 20 can monitor the vehicle-related data stored in the customer database for DTCs indicating that the vehicle may have a component that is in need of service or repair. If such a condition is detected, call center 20 can provide the authorized user with notification recommending that they seek appropriate maintenance to remedy the problem.

Next, step 110 stores at least a portion of the vehicle-related data in a second, temporary database, where the portion of vehicle-related data that is stored is that data approved by the customer or other authorized user for distribution to at least some third parties. The temporary database, also referred to as a third party database, stores user-approved vehicle-related data on a temporary basis so that an authorized third party can access the data in a controlled manner before it is deleted. In one embodiment, the third party database includes one or more flat files that are available to authorized third parties accessing the information from outside of the call center. Alternatively, the database can be implemented using any other suitable data structures, with appropriate interface software that generates the flat files as needed. The flat file can be useful in that it is generally a generic data type, thus an authorized third party can access the flat file without having to purchase costly proprietary software. For instance, a standard web browser or like program should be capable of reading the flat file. According to one example, the flat file is a delimited file containing a number of different cells or fields, where each cell maintains a single piece of vehicle-related data such as a vehicle mileage reading, a vehicle location, a vehicle history record, a DTC, an engine oil life reading, emissions data, tire pressure, or a VIN. The flat file discussed above is simply one type of data structure that may be used, as numerous other data structures known to those skilled in the art. For example, the data can be supplied from the temporary database as XML-tagged data, or simply as ASCII text. It can also be encrypted during transmission using known techniques. Moreover, the data can be stored or made available in a read only format to prevent any authorized third parties from modifying the data or deleting data contained in the third party database.

As discussed above, the authorized user can establish a set of business rules that are the primary bases for determining which pieces of vehicle-related data, if any, are to be saved to the third party database and be made available to the authorized third parties. These business rules, which can be developed with input from the authorized user and through the use of a variety of software tools, can be run or otherwise executed during step 110 or at any other time preceding the distribution of the vehicle-related data to the third parties. In the example where the vehicle owner or other authorized user approves an oil change shop to have access to vehicle mileage data and an automotive component supplier to have access to certain DTCs relating to the supplied component, a vehicle mileage reading and relevant DTCs are saved to the temporary third party database and are made available to the oil shop and the automotive component supplier, respectively, while the remaining vehicle-related data is only saved and maintained within the customer database. Of course, the established business rules could provide for any number of different combinations of vehicle-related data to be temporarily stored in the third party database and made available to authorized third parties. It is also possible for the vehicle owner to decide that they do not wish any vehicle-related data to be shared with third parties, in which case the vehicle-related data transmitted from telematics unit 30 would be stored in the customer database, but not the third party database.

One technique that could be used in conjunction with the aforementioned business rules involves tagging certain components of the vehicle-related data after they have been approved for third party distribution by the authorized user. The electronic tag, which can be in the form of a flag, variable or other indicator known to those skilled in the art, indicates to the system that the corresponding data can be made available to certain third parties. In addition, the electronic tag can also indicate to which third parties the data will be made available. According to different embodiments, the third party database can be organized such that various files of vehicle-related data are grouped together within the database and are given a tag for the entire group, or it can be organized such that each vehicle-related data file is individually tagged.

In step 112, the method enables one or more authorized third parties to access the portion of the vehicle-related data that has been stored in the third party database. Although it is preferable that the third party database be coupled to land network 16 so that its contents can be securely shared with a number of different remote third parties over networks such as the Internet, it should be appreciated that there are numerous ways in which step 112 could be performed. For instance, step 112 could first involve notifying one or more authorized third parties that vehicle-related data is available for retrieval, and then verifying their identify when they attempt to retrieve the data. This embodiment could use one of a number of different methods for notifying the third parties, including sending automated email notifications, facsimiles, instant messages, text messages, automated phone calls, etc. The communication from call center 20 could be an encrypted message that is readable only by a machine having the proper encryption tools. Furthermore, the notification to the third party could include a temporary password, a security code, a login ID, a link, an URL, an IP address, or some other electronic key required for them to gain access to the vehicle-related data stored in the third party database. It is also possible for the notification to contain information related to the type of vehicle-related data that is available and to the source of such data (i.e.—which vehicle it pertains to), such as a customer ID, a VIN, a subscriber account number, or the like. Call center 20 could use the IP address of a third party that is seeking database access as a means for confirming the identity of that party and to ensure that it is in fact authorized. Once the authorized third party has been properly authenticated, access is given to appropriate portions of the third party database through an affiliated website, a data interface with call center 20, a live advisor, or an electronic message, to name but a few possibilities. Staying with the example used above, step 112 could involve automatically sending an electronic notification to the oil-change shop informing them that an engine oil life reading is available, and automatically sending a message to the automotive component supplier that a DTC relating to the component that they supply is ready for retrieval.

Alternatively, instead of providing notification to a third party that vehicle-related data is available, as in the example above, step 112 can simply communicate the appropriate vehicle-related data to the authorized third party. For instance, call center 20 can send the authorized third party an email or other electronic message, a facsimile, a letter, a verbal message, etc. containing the vehicle-related data that they have been approved to receive. The communication to the authorized third party, whether it simply be a notification or it actually include the vehicle-related data, can be sent separately for each available file in the third party database or it can encompass all of the vehicle-related data recently made available. For example, the communication could be a general, periodic notification to the authorized third party that new data is available, and during the retrieval process the third party would be granted access to the appropriate accounts.

Next, certain portions of the vehicle-related data are deleted or otherwise removed from the third party database in response to one of a number of different events, step 114. For example, each piece of data saved to the third party database could be given an expiration so that when the expiration occurs, that data is deleted or otherwise removed. In this embodiment, the authorized third party is provided with a window of time in which they are able to retrieve the designated data. After the expiration of this time period, the designated data is automatically deleted from the third party database and is no longer available for retrieval. Information pertaining to this time limit or expiration can be communicated to the authorized third party during step 112 or at some other appropriate time, or it can be previously agreed upon and known to the third party. As an example, data in the third party database could be set to expire on the same day of each month.

According to a different embodiment, the third party database can be set up such that certain vehicle-related data is deleted after an authorized third party has accessed the information; that is, it is only available for one retrieval. For instance, a vehicle owner who is purchasing a used vehicle may wish to provide a state governmental entity or other third party with one-time access to the vehicle's current mileage so that they may verify the vehicle's mileage for their official records. In this instance, the vehicle mileage reading may be transmitted to call center 20 and stored in the third party database one time; after which, subsequent vehicle mileage readings would only be saved in the customer database and not the third party database. Of course there are a number of different techniques that could be used in order to accomplish this one-time-retrieval scenario, including removing all vehicle-related data that is associated with a third party once that third party accesses the third party database (ie—third party has one opportunity to retrieve all currently available vehicle-related data), or removing only that data that has been accessed by the third party (ie—third party can still retrieve other non-accessed vehicle-related data until the occurrence of another event). If an authorized third party accesses the third party database and finds some portion of the expected vehicle-related data to be missing, it can request that the data be replaced and that it be notified once the data is made available.

Additional features and embodiments are of course possible. For example, the customer may authorize call center 20 to make some of the vehicle-related data from the customer database and/or the third party database available to live advisors in the call center. The live advisors can then verbally or otherwise provide the authorized third parties with information from the customer database and/or the third party database. It is also possible for the business rules to prevent specific types of vehicle-related data from being made available to third parties; even if so authorized. For example, a vehicle OEM can define an overriding business rule that prevents DTCs or specific information related to warranties from being made available to competing automotive component suppliers, even if they are authorized by the vehicle user to receive such information.

It is to be understood that the foregoing description is not a definition of the invention, but is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "for instance," "like," and "such as," and the verbs "comprising," "having," "including," and their other verb forms, when used in conjunction with a listing of one or more components or other items, are each to be construed as open-ended, meaning that that the listing is not to be considered as excluding other, additional components or items. Other terms are to be construed using their broadest reasonable meaning unless they are used in a context that requires a different interpretation.

The invention claimed is:

1. A method for making vehicle-related data available to an authorized third party, comprising the steps of:

(a) receiving vehicle-related data from a telematics unit that is located in a vehicle;

(b) storing the vehicle-related data in a first database;

(c) storing at least a portion of the vehicle-related data in a second, temporary database, wherein authorization has been given by an authorized user which enables an authorized third party to access at least some of the vehicle-related data that is stored in the second database;

(d) enabling the authorized third party to access at least some of the vehicle-related data that is stored in the second database; and thereafter (e) deleting the accessible vehicle-related data that is stored in the second database.

2. The method of claim 1, wherein the method further comprises obtaining the vehicle-related data from one or more vehicle electronic modules (VEMs) located in the vehicle, before performing step (a).

3. The method of claim 1, wherein the method further comprises assigning a priority level to the vehicle-related data based on the type of data that it is, before performing step (a).

4. The method of claim 1, wherein step (a) further comprises wirelessly receiving the vehicle-related data from the telematics unit at a call center over a wireless carrier system.

5. The method of claim 1, wherein step (b) further comprises storing the vehicle-related data in a first database that is a customer database including both vehicle-related data and customer-related data.

6. The method of claim 1, wherein the method further comprises tagging the portion of vehicle-related data that is stored in the second database so that it is identified as being available to the authorized third party, before performing step (c).

7. The method of claim 1, wherein the method further comprises utilizing one or more business rule(s) to determine which portion of the vehicle-related data is to be stored in the second database, before performing step (c).

8. The method of claim 7, wherein the business rule(s) are at least partially developed with input from the authorized user.

9. The method of claim 1, wherein step (d) further comprises enabling the authorized third party to access at least some of the vehicle-related data that is stored in the second database by notifying the authorized third party that vehicle-related data is available for retrieval, and then verifying the authorized third party when they attempt to retrieve the vehicle-related data.

10. The method of claim 9, wherein step (d) further comprises sending the authorized third party a password for accessing the vehicle-related data that is available for retrieval.

11. The method of claim 1, wherein step (d) further comprises enabling the authorized third party to access at least some of the vehicle-related data that is stored in the second database by sending the accessed vehicle-related data to the authorized third party.

12. The method of claim 1, wherein step (e) further comprises deleting the portion of vehicle-related data that is stored in the second database after an expiration associated with that portion of vehicle-related data occurs.

13. The method of claim 1, wherein step (e) further comprises deleting the portion of vehicle-related data that is stored in the second database after the authorized third party has accessed that portion of vehicle-related data.

14. The method of claim 1, wherein the portion of vehicle-related data that is stored in the second database includes at least one piece of data selected from the list consisting of: a vehicle mileage, a vehicle location, a vehicle history, a diagnostic trouble code (DTC), an engine oil life reading, emissions data, and a tire pressure, and a vehicle identification number (VIN).

15. A method for making vehicle-related data available to an authorized third party, comprising the steps of:

(a) storing vehicle-related data in a customer database;

(b) storing at least a portion of the vehicle-related data in a third party database, wherein authorization has been given by an authorized user which enables an authorized third party to access at least some of the vehicle-related data that is stored in the third party database;

(c) alerting the authorized third party that the vehicle-related data that is stored in the third party database is available;

(d) enabling the authorized third party to access at least some of the vehicle-related data that is stored in the third party database; and (e) deleting the accessible vehicle-related data that is stored in the third party database in response to at least one of the following events:

(i) an expiration of time, and (ii) an access of the vehicle-related data by the authorized third party.

16. The method of claim 15, wherein the method further comprises obtaining the vehicle-related data from one or more vehicle electronic modules (VEMs) located in the vehicle and wirelessly receiving the vehicle-related data from a telematics unit at a call center over a wireless carrier system, before performing step (a).

17. The method of claim 15, wherein the method further comprises assigning a priority level to the vehicle-related data based on the type of data that it is, before performing step (a).

18. The method of claim 15, wherein the method further comprises tagging the portion of vehicle-related data that is stored in the third party database so that it is identified as being available to the authorized third party, before performing step (b).

19. The method of claim 15, wherein the method further comprises utilizing one or more business rule(s) to determine which portion of the vehicle-related data is to be stored in the third party database, before performing step (b).

20. The method of claim 19, wherein the business rule(s) are at least partially developed with input from the authorized user.

21. The method of claim 15, wherein step (c) further comprises sending the authorized third party a password for accessing the portion of vehicle-related data that is available for retrieval.

22. The method of claim 15, wherein the portion of vehicle-related data that is stored in the third party database includes at least one piece of data selected from the list consisting of: a vehicle mileage, a vehicle location, a vehicle history, a diagnostic trouble code (DTC), an engine oil life reading, emissions data, and a tire pressure, and a vehicle identification number (VIN).

23. A method for making vehicle-related data available to an authorized third party, comprising the steps of:

(a) transmitting vehicle-related data approved by an authorized user from a telematics unit that is located in a vehicle to a call center over a wireless carrier system;

(b) storing the vehicle-related data in a customer database that includes both vehicle-related data and customer-related data;

(c) utilizing one or more business rule(s) that are at least partially developed with input from the authorized user to determine which vehicle-related data will be stored in a third party database;

(d) storing a portion of the vehicle-related data in the third party database;

(e) alerting the authorized third party that the portion of vehicle-related data that is stored in the third party database is available, wherein authorization has been given to enable the authorized third party to access the portion of vehicle-related data that is stored in the third party database;

(f) enabling the authorized third party to access the portion of vehicle-related data that is stored in the third party database; and (g) deleting the portion of vehicle-related data that is stored in the third party database once the data is accessed by the authorized third party or once an expiration associated with that portion of the vehicle-related data expires, whichever occurs first.

* * * * *